Jan. 25, 1966   J. A. HARVEY   3,231,245
MOBILE GROUTING PLANT
Filed Oct. 10, 1963   5 Sheets-Sheet 2

INVENTOR.
James A. Harvey
BY
Attorneys

Jan. 25, 1966        J. A. HARVEY        3,231,245

MOBILE GROUTING PLANT

Filed Oct. 10, 1963        5 Sheets-Sheet 3

INVENTOR.
James A. Harvey
BY
Attorneys

Jan. 25, 1966  J. A. HARVEY  3,231,245
MOBILE GROUTING PLANT
Filed Oct. 10, 1963  5 Sheets-Sheet 4
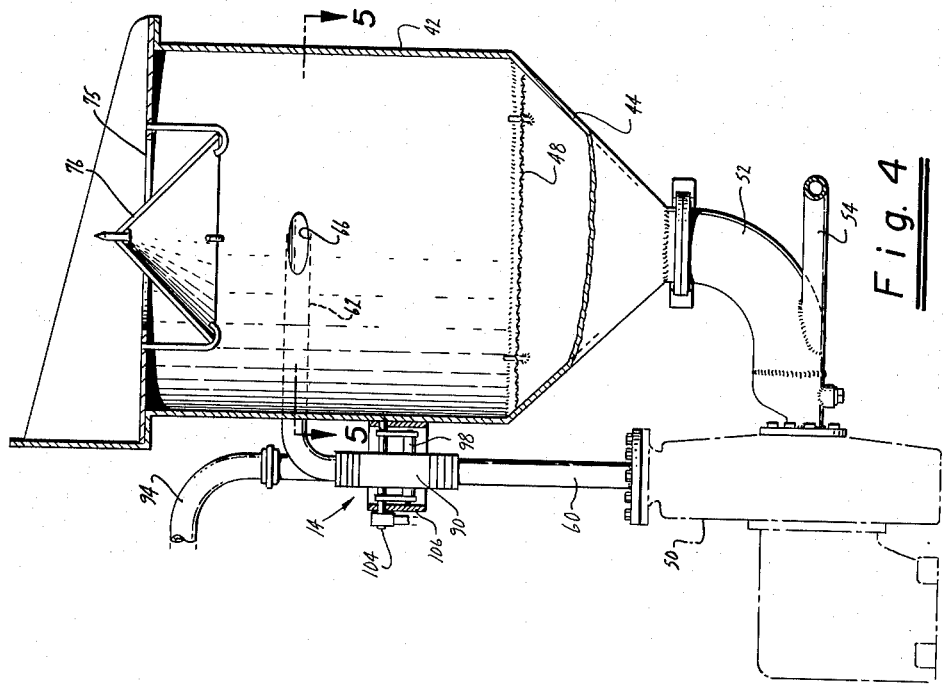
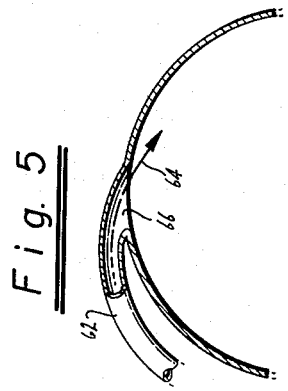
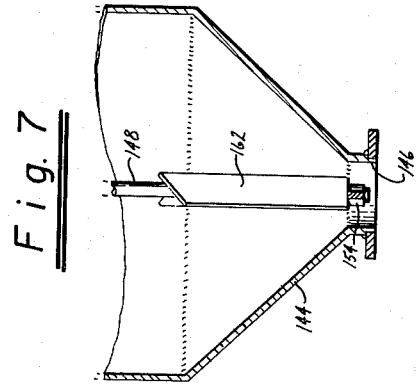
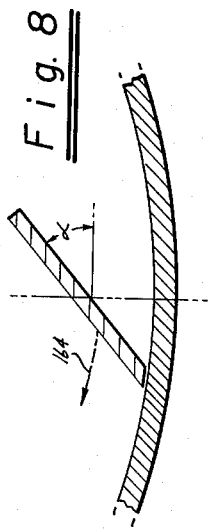
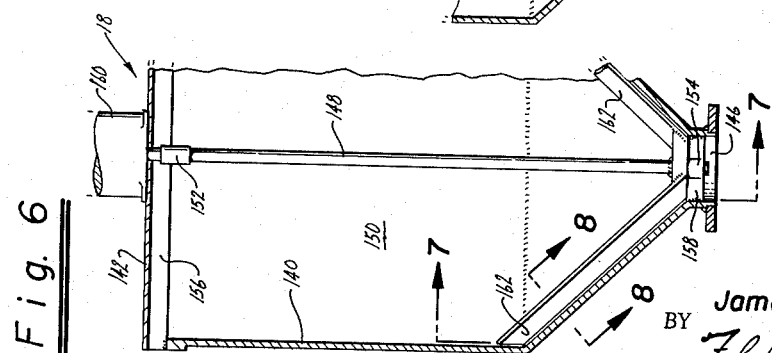
INVENTOR.
James A. Harvey
BY
Attorneys

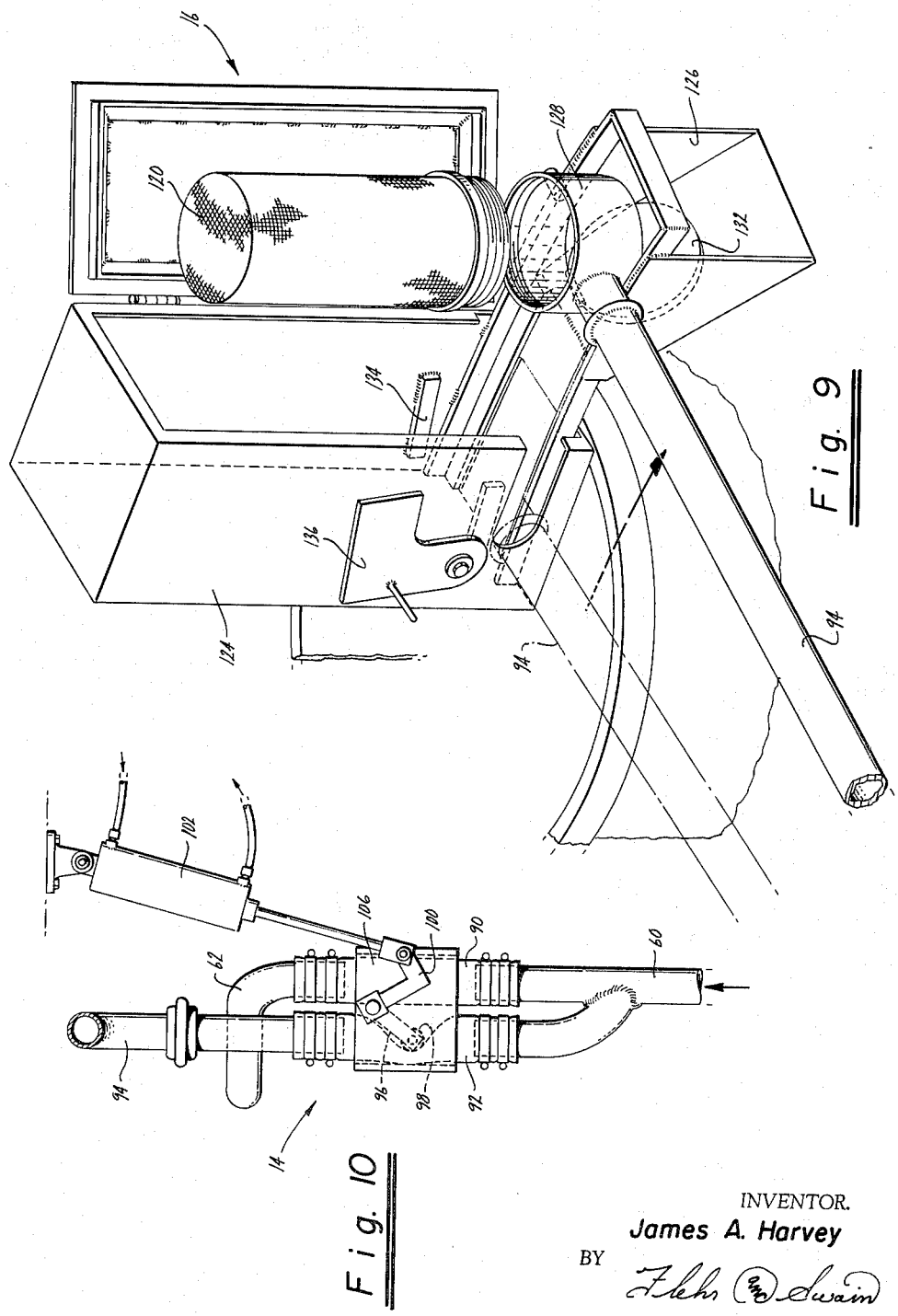

United States Patent Office 3,231,245
Patented Jan. 25, 1966

3,231,245
MOBILE GROUTING PLANT
James A. Harvey, 36 Valley View Drive, Apt. 18,
Oroville, Calif.
Filed Oct. 10, 1963, Ser. No. 315,274
6 Claims. (Cl. 259—153)

This invention relates generally to a mobile grouting plant and particularly to such a plant which is completely self-contained and capable of carrying out all essential grout mixing and pumping operations at the work site.

As is well known, grout is a mixture of cement and water, or cement, sand and water, of such consistency that it will flow or may be forced by pressure into small confined spaces. In present practice, grout is widely used to seal geological faults, cracks, crevices, or other cavities in the rough foundations of dams, in tunnel liners, and similar components of large scale construction projects. Grout is also excellent for use in the preparation of column footings and machine foundations which require level bearing surfaces, or for use in the stabilization of soils or sealing of various water bearing surface or subsurface areas.

In construction projects of the types described, it is customary to construct the grouting plant at the site. In addition to lost time and frequently excessive labor and material expense, stationary grouting plants of this type are subject to various shortcomings. For one thing, such plants are limited in use to a restricted area surrounding the plant and determined by the pumping capacity of the equipment employed. In tunnel and mining operations for example, it is frequently necessary to dismount and reassemble the plant at various locations within the job area. A further difficulty arises because skilled labor to construct the grouting plant is frequently unavailable in the area of intended use, thereby increasing the burden and expense of construction.

The present invention is directed to what now appears to be a simple solution to the above and to additional problems, as will appear, and one object of the invention is therefore to provide a completely self-contained mobile grouting plant capable of carrying out all the essential operations normally performed by conventional stationary grout plants.

Another object of the invention is to provide a mobile grouting plant of the above character having improved means for mixing and maintaining the grout, and for pumping the grout to the desired area of use.

Additional objects of the invention will appear from the following description in which a preferred embodiment of the invention has been set forth in detail in conjunction with the accompanying drawings.

Referring to the drawings:

FIGURE 4 is a detail view in vertical section of a mixing station within the plant;

FIGURE 5 is a sectional view along the line 5—5 of FIGURE 4;

FIGURE 6 is a detail view in vertical section of a holding station within the mobile plant;

FIGURE 7 is a like view along the line 7—7 of FIGURE 6;

FIGURE 8 is an enlarged sectional view along the line 8—8 of FIGURE 6;

FIGURE 9 is an enlarged perspective view of a grout feeding station within the machine, illustrating a feature of its operation;

FIGURE 10 is a detail view in side elevtaion of a valving mechanism associated with a transfer station within the machine.

Figure 1:
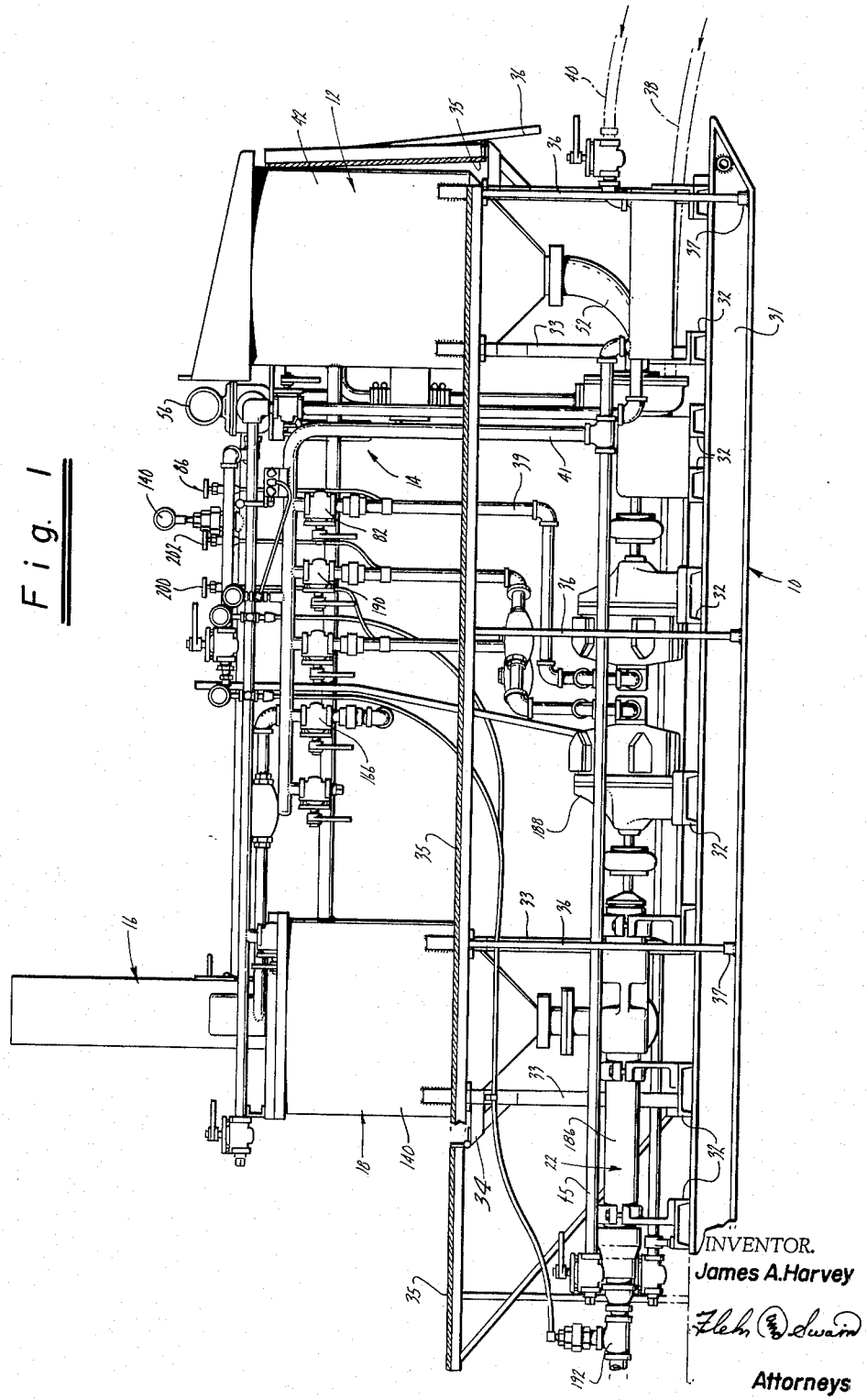
FIGURE 1 is a view in side elevation of a mobile grout plant or machine incorporating the present invention.

The mobile grouting plant of the present invention consists generally of a frame 10 in conjunction with a grout mixing station 12, a transfer station 14, a pressure screening station 16, grout holding station 18, and one or more grout pumping stations 20 and 22. If desired, the frame can be carried by forward and rear sets of pneumatic tired wheels (not shown), or alternatively, can be employed as a skid which is transported to and from the job site by any suitable transporting vehicle such as a truck.

In general, once it has been transported to a work site, my machine performs the functions of receiving water and the dry ingredients of a grouting mix within the mixing station 12, forming the same at such station into a pumpable slurry of predetermined particle size, periodically transferring the resultant mix through the transfer station 14 to the screening station 16 where it is delivered as a slurry of final, controlled particle size to the holding station 18. Within the holding station, the grout is continuously agitated in a vertical rotary motion to maintain the mix in desired slurry form until such time as the grout is demanded at the work site. The grouting mix is then delivered through the high pressure pumping means at the pumping station 20 or 22, and through a supply line of desired length and high pressure capacity, to the point of use. In actual use, the grouting plant of the present invention has been moved with comparative ease to the site of relatively inaccessible construction projects, and has functioned to deliver grout satisfactorily from the mobile unit for a distance in excess of one-half mile.

Figure 2:
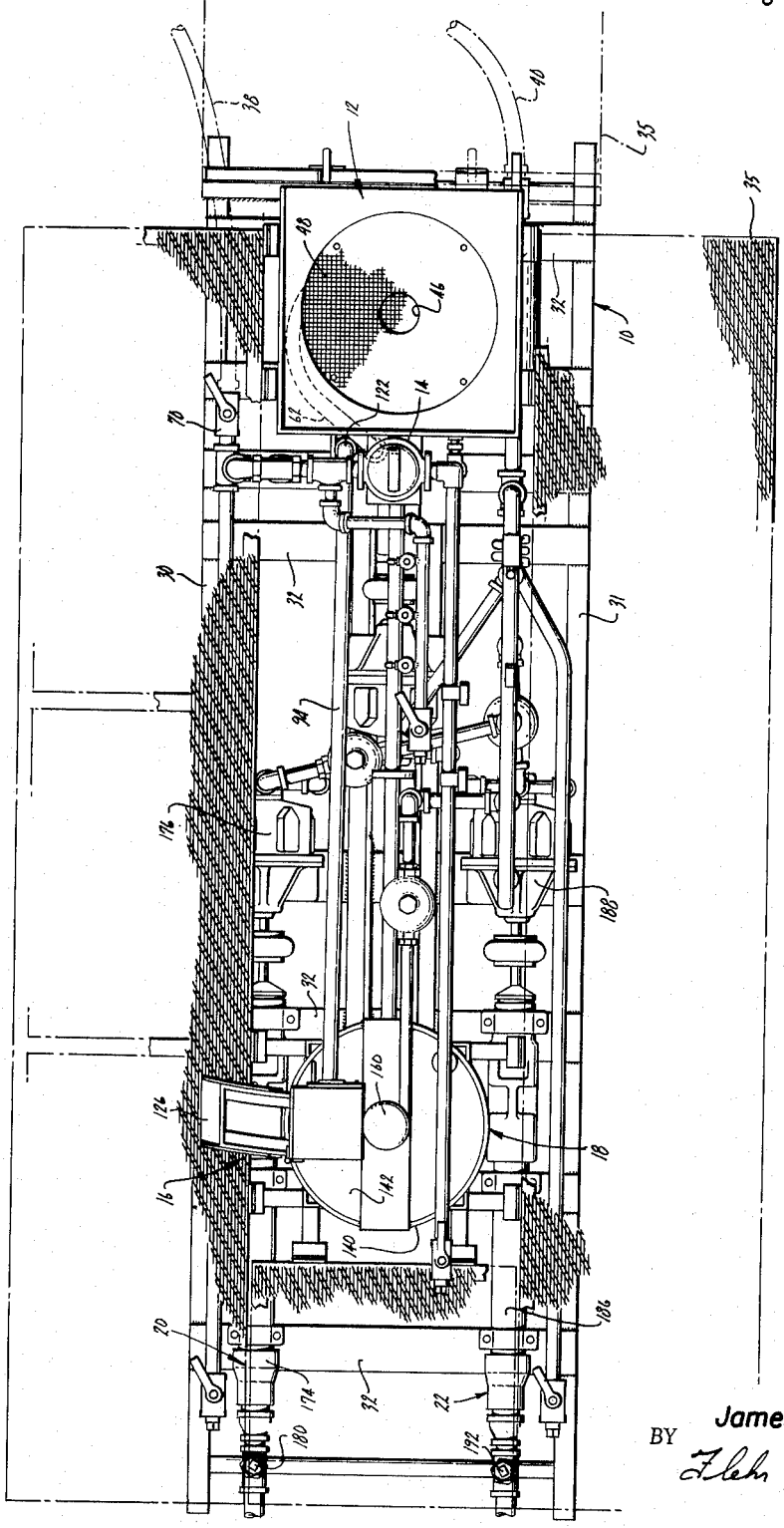
FIGURE 2 is a top plan view thereof.

The illustrated grouting plant generally comprises a frame 10 including respective side frame members or skids 30 and 31 which are connected together by cross bracing members 32 (FIGURES 1 and 2). The frame 10 provides a load supporting platform or mounting for means forming various operating subassemblies of the plant, specifically the mixing station 12, transfer station 14, screening station 16, loading station 18, and pumping station 20 or 22, mentioned above. The frame also carries upstanding supports 33 and cross bracing members 34 which provide a mounting for retractable catwalks or platforms 35 for the operating personnel (one or two men, under most conditions). The latter are held in working position by arms 36 pivotally carried by the catwalks and received in the side frames, as at 37.

Figure 3:
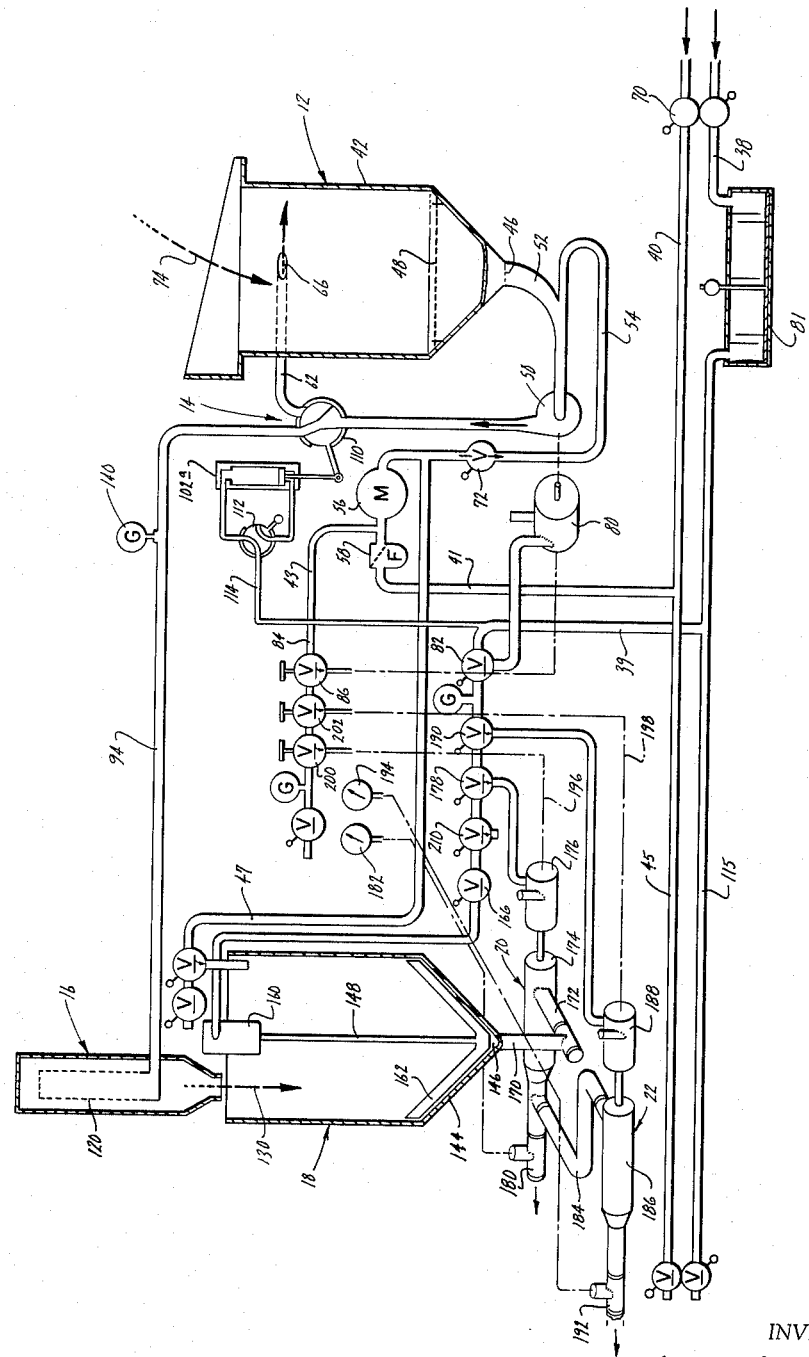
FIGURE 3 is a schematic view, similar to FIGURE 1, illustrating the operation of the mobile plant.

The machine illustrated in the drawing is designed for operation in conjunction with a combined hydraulic and pneumatic system. The pneumatic system is supplied with compressed air or other gaseous fluid from a portable compressor or other source (not shown) by means of the main supply line 38 (FIGURE 3). The line 38 supplies pressure to the various air motors and operating cylinders of machinery components of the plant as hereinafter described through the secondary line 39. Air pressure for various auxiliary purposes can also be supplied through the auxiliary lines 114 and 115.

The illustrated machine is also designed to operate in conjunction with a hydraulic system employing a supply of water under suitable pressure or hydrostatic head. Water is delivered from the supply source (not shown) to the main supply line 40 (FIGURE 3) for the hydraulic system. As will be described, a predetermined amount of water is initially delivered through the line 41 and metering device 56 for use in the mixing operations at the station 12. Hydraulic pressure is also supplied through the auxiliary line 43 to various valve controls, and to wash lines, such as the lines 45 and 47 in operating and maintaining the mobile plant.

The mixing station

The mixing station 12 (FIGURES 1 through 5) is shown in detail in FIGURE 4. In general, this station includes a substantially upright cylindrical mixing tank 42 provided with a conical bottom 44, having an outlet 46 near its lower end. Rough screening means 48 in the form of a rugged heavy duty wire mesh or perforated plate is positioned transversely of the mixing chamber above the discharge outlet for purposes to be later described. The outlet is in fluid communication with a heavy duty centrifugal pump 50 by means of the discharge conduit 52. Conduit 52 is additionally provided with an inlet 54 which is connected through the meter 56 and rock filter 58 with the feed water supply line 40. The discharge from the pump 50 passes through the conduit 60 and the valving means at the transfer station 14 to a recycle inlet conduit 62. As best illustrated in FIGURE 5, the latter discharges into the mixing tank along a flow path represented by the arrow 64 directed slightly inwardly of a tangential flow path. This construction imparts a violent swirling motion and simultaneous centrifugal mixing of the slurried materials circulating outward from the recycle line through the opening 66 and into the upper portion of the mixing chamber 42.

The operations at the mixing station generally involve the introduction of a measured amount of water through the main valve 70, rock filter 58, metering device 56, and check valve 72 to the suction side of the centrifugal pump 50. The valving means at the transfer station 14 is normally positioned to discharge the water through the opening 66 to the top of the mixing tank 42 where the water circulates in a generally circular path. After the measured amount of water is circulating within the mixing tank, the valve 72 is closed, and a measured amount of dry grouting mix (e.g., cement, or cement and bentonite, or sand, cement, and bentonite, etc.—depending on the job requirements) is introduced through an opening 75 in the top of the mixing tank as generally indicated by the arrow 74 in FIGURE 3. To insure that the dry ingredients are rapidly deposited in the water circulating within the mixing chamber, baffle means 76 can be provided adjacent the upper end of the mixing tank as particularly shown in FIGURE 4. The dry ingredients are quickly mixed with the circulating water and soon form a slurry within the mixing tank. This slurry swirls downward to achieve the desired centrifugal mixing until contact is made with the screen 48. On contact with the screen the slurry circulates rapidly around the surface of the screen in a rolling motion due to the combined effects of centrifugal force and frictional drag. This combined action is very beneficial since it causes large aggregates or lumps of cement, sand, bentonite, etc. to roll around on the screen and break up, thereby materially assisting in the mixing action. Below the screen 48, a slurry of predetermined intermediate particle size (determined by the mesh of the screen) collects in the form of a gently agitated body adapted to maintaining the required suction for the rotary pump 50. The slurry is quickly sucked through the conduit 52 and pump 50, and is discharged through the return line 60 and recycle line 62 for further turbulent mixing within the mixing tank 42. In this way a pumpable grouting mix in the form of a thick aqueous slurry is quickly formed under conditions which insure a maximum intermediate particle size in the slurry discharge through the line 60.

Referring to FIGURE 3, it will be noted that the rotary pump 50 is driven by an air motor 80, operated by compressed air entering through the main supply line 38, manifold 81, and throttle control valve 82. The construction of the centrifugal pump 50 and associated air motor 80 is such that the grout in slurry form can be circulated through the pump with a proper seal against leakage of grout. Thus, FIGURE 3 schematically illustrates an arrangement where water is introduced from the auxiliary hydraulic line 84 through a control throttle valve 86 to the pump backing to seal against leakage of the grout.

The transfer station

The transfer station (FIGURES 4 and 10) generally comprises a valving mechanism in the recycle line at the mixing station, and operable to discharge a completely mixed grout in slurry form to the pressure screening station 16 and ultimately to the grout holding station 18.

As particularly illustrated in FIGURE 10, the transfer valving mechanism includes a pair of flexible conduit sections 90, 92, one connecting the recycle line 60, 62, and the other connecting the conduit 60 with the discharge line 94 leading to the pressure screening station 16. The valving mechanism is generally positioned between the two flexible conduits and comprises a pair of cranks 96 and associated roller 98 pivotally movable in response to movements of actuator arms 100 operated by the air cylinder 102. The cranks 96 and actuator arms 100 are all mounted on a common pivot shaft 104 supported by the mounting bracket 106 (note FIGURE 4). On operation of the air cylinder 102 to extend the actuating arms 100, the crank 96 and roller 98 are moved to the left (as viewed in FIGURE 10) to close the discharge line 94. This position of the parts exists during the mixing operation at the mixing station. On operation of the air cylinder to retract the actuating arms 100, the crank and roller assembly is shifted to the right to open discharge line 94 and to simultaneously close the recycle line 60, 62. The effect is immediately to discharge the slurry from the bottom of mixing chamber 42 through the line 94 to the screening station 18.

The above operation will be easily understood by reference to the schematic showing in FIGURE 3. In this figure, the valving mechanism is represented as a rotary unit 110 adapted to be shifted by the operation of air cylinder 102a. However, the basic function of the valving mechanism is identical. As will be understood in FIGURE 3, the air cylinder 102 is operated by means of a control valve 112 positioned in an auxiliary air line 114. In the position of the parts illustrated, the valving mechanism 110 is discharging the slurry from the mixing station through the pump 50 and transfer station to the pressure screening station 16. After discharge of the grout slurry from the screening station into the tank 18, the air valve 112 is manually shifted causing the air cylinder 102a to retract to shift the valve 110 to the recycle position. Water is introduced through the line 54 to the mixing station along with the dry grout ingredients in the manner previously described.

The screening station

The pressure screening station 16 (FIGURES 3 and 9) generally functions to deliver a grouting mixture of desired consistency and particle size to the holding station 18, prior to use of the grout at the construction site.

Referring to FIGURE 9, the station 16 includes an additional screening unit 120 mounted at the discharge end of the conduit 94. The latter is supported at its inlet end by means of a swivel coupling or similar coupling device 122. This construction permits pivotal movements of the screening unit 120 between an operation position within a discharge housing 124 normally surrounding the unit, and an external position above an auxiliary discharge chute 126. The latter is positioned to discharge outward of the tank 140 at the holding station 18.

Referring specifically to FIGURE 9, the screening mechanism is threaded into a closed cup 128 secured to the discharge end of the conduit 94. The slurry passing through the conduit must therefore pass upwardly through the pressure screening unit 120 and outwardly through the interstices of the screen into the discharge housing 124 before it can fall by gravity into the tank at the holding station. This latter operation is represented schematically in FIGURE 3 by the arrow 130. The screen mechanism 120 thus functions to insure that a grouting mix of desired particle size will enter the holding station. Any rocks or aggregates of materials inadvertently passing through the transfer station 14 will be retained within the cup 128. Periodically this cup is emptied by swinging the discharge conduit 94 to a cleaning position shown in full lines in FIGURE 9, and releasing the pivoted closure 132 forming the bottom of the cup 128 (note dotted position in FIGURE 9). Oversized materials are thus discharged onto the chute 126, and discarded. The screening unit is then washed by a spray of water from one of the auxiliary wash lines and returned to the screening position within the housing 124. Suitable mounting means for the screening device in the form of camming members 134 serve to hold the screening mechanism in desired position within the housing 124. A latching device 136 is also employed to hold the conduit 94 is desired feeding position represented by the dotted position in FIGURE 9.

To insure proper control over the density or consistency of the grouting mixture delivered by the screening station 16 to the station 18, a fluid pressure gauge 140 is preferably positioned in the line 94 for monitoring by the operator. If the device 140 registers a pressure above a maximum desired value (e.g., 80 to 110 p.s.i.), the operator knows that the filtering pressure of the screening device 120 is too great, and that the mix is either of improper consistency, or the screening device needs cleaning. Alternatively, if the pressure registered at the device 140 is too low (e.g. below 80 p.s.i.), the operator knows that the grouting mixture is too thin or of improper consistency for feeding to the holding station. It will be understood that different grouting mixtures will normally require the use of screening units 120 of varying size of screening apertures, according to the intended use of the mix. The operating pressure range indicated by the device 140 will consequently vary with the particular use of the grouting plant.

*Holding station*

The holding station 18 (FIGURES 6 to 8) receives the screened grouting mixture from the screening station 16 and maintains the mixture in the desired slurry form suitable for pumping to the point of use at the construction site.

Referring particularly to FIGURE 6, the holding station is illustrated in the form of an upright cylindrical chamber 150 provided with a closed top 142 and a conical bottom section 144 tapering to a bottom outlet at 146. A rotary drive shaft 148 extends vertically through the chamber 150 and is journalled in bearings 152 and 154 at the top and bottom of the tank. As illustrated in FIGURE 6, the top bearing 152 is supported by the cross bracing member 156 adjacent the top of the tank whereas the bottom bearing 154 is supported by a cross bracing member 158 mounted in the lower discharge opening 146. The shaft 148 is adapted to be rotated by an air motor 160 supported on the top of the tank and carries mixing arms or agitators 162 at its lower end. The agitators 162 extend generally parallel to the bottom section 144 of the tank, and as illustrated in FIGURE 8, are inclined to the outer surfaces of the tank at a substantial angle, as indicated by the angle α in FIGURE 8. The direction of rotation of the agitators 162 is such that the grout mixture is generally rotated upward and inward to effect a turbulent agitation of the grouting mix.

Referring to FIGURE 3, the agitators 162 are rotated at a variable speed determined by the air motor 160 and the throttle valve control mechanism 166. This construction permits some control over the rate of discharge through the outlet 146 during the operations at the pumping stations 20 and 22 to deliver the grouting mix to the point of use. As will be apparent to a worker in this art, a certain valving action can be obtained by the rate of rotation of the agitator arms 162, greater speeds of rotation tending to increase the rate of discharge of material through the outlet 146. The operation of the agitator also tends to insure an even uniform discharge of material to the pumping stations. The agitator also tends to maintain uniform consistency of the mix and to prevent settling of heavy materials such as sand in the cases of mixes containing large proportions of sand. In addition, the cooperating construction of the agitator blades of the sloping bottom 144 of the tank tends to avoid appreciable losses in down time normally required for cleaning.

*Pumping stations*

Each of the pumping stations 20 and 22 (FIGURES 1 and 3) is capable of delivering the grouting mix held at the station 18 through a high pressure discharge line to a desired point of use. For example, the pumping stations can be used concurrently, or separately with one being maintained as a standby. The pumping stations can also be employed in tandem to increase the working pressure and the range of delivery through a single discharge line.

Referring specifically to FIGURE 3, the pumping stations are arranged with respect to the discharge conduits 170 and 172, at the holding station so that the grouting mixture is delivered first to the high pressure pump 174 at the station 20. The pump 174 is generally of a high pressure, screw conveyer type operated by the air motor 176 under the control of the throttle valve 178. In a typical operation, the discharge from the pump 174 can pass through the discharge valve and sensing unit 180 to a discharge supply line of desired length and high pressure capacity. The unit 180 is suitably provided with a pressure sensing unit 182 to register the discharge pressure from the pumping unit. Alternatively, the discharge from the pump 174 can pass through the connecting conduit 184 to the pump 186 at the second pumping station 22. The pump 186 is of similar type driven by the air motor 188 under the control of the throttle valve 190. The discharge from the pump 186 similarly passes through the discharge valve and sensing unit 192, with the discharge pressure being registered at 194.

In general, the air motors 176 and 188 are operated by compressed air delivered through the main supply line 38 and branch line 39. As in the case of the centrifugal pump 50, the pumps 174 and 186 and associated air motors 176 and 188 are provided with hydraulic seals against leakage of grout, with water being introduced to the pump packings through the auxiliary lines 196, and 198, respectively, under the control of the valves 200 and 202.

During use of the grouting plant, the pumping stations 20 and 22 can be employed simultaneously for separate operations by operation of the air motors 176, 188 with the valve units 180 and 192 in open position. Should it be desired to restrict the operation to the pump 174 and its associated discharge line, the motor 188 can be stopped, thereby providing an effective valving action at the pump 186. Where operation of a single discharge line at increased pressure is desired, the valve 180 can be closed and both pumps operated to discharge the grouting mixture through pump 174, connecting conduit 184 and finally through the discharge line associated with pump 186. The illustrated system of apparatus is therefore extremely flexible, and adapted to a wide variety of uses as will hereinafter appear.

*Operation*

Reviewing briefly the operation of the grouting plant illustrated in the drawings, a measured amount of water is first introduced through the valves 70 and 72 and metering device 56 to the circulating pump 50 at the mixing station 12. Prior to this filling operation and during subsequent operations at the mixing station, the control 112 is manipulated to position the valving mechanism at the transfer station 14 in the recycle position, for example as illustrated in FIGURE 10. The feed water is thus caused to cycle through the return lines 60 and 62 to the inlet 66 at the top of the mixing tank 42. The described recycle operation causes the feed water to spin in centrifugal fashion within the upper portion of the chamber 42 until contact is made with the screen device 48 located in the bottom of the chamber above the discharge outlet 46.

At this point in the operation, the various dry ingredients of the grouting mix are introduced in measured amount though the opening 75 provided in the top of the mixing tank to fall into the swirling liquid mass within the mixing tank. The present system of apparatus has proved capable of handling any desired grouting mixture, ranging from a very fine mix such as might be used with compacted soils, in tunnel linings, and the like, up to very coarse mixes as might be used with very rocky soils in the rough foundations of dams, etc. To illustrate, a fine mix (i.e., capable of passing a 100-mesh screen, Tyler standard series) might comprise a mixture of cement and water, or cement, bentonite, and water, in a ratio of dry ingredients to water ranging from about 1:1 to 1:4. A medium to coarse mix might similarly comprise cement and/or bentonite or similar material intermixed with substantially increased portions of sand. In very coarse mixes, the proportion of sand might be further increased as well as the texture of the sand employed, with the proportion of sand to cement ranging from about 1:1 to as high as 8:1. Relatively fine aggregates might be employed in such mixes. In conjunction with these coarse mixes, the screening device 48 might consist of a 16-gauge sheet metal with ¼ inch perforations dispersed over the surface at spacings of less than ⅟₁₆ inch.

In general, my new grouting plant successfully handles any grouting mixture of the types described, the action of the rotary pump 50 and the centrifugal action within the mixing tank 42 providing a relatively uniform mixture and consistency of the heavy and light materials of the mix. In addition the screening device 48 serves to break up large aggregates or lumps of cement, sand, clay, etc., as they roll around on the surface of the screen, thereby assisting in the mixing action and insuring a desired consistency of the mix suitable for pumping.

After an appropriate mixing period, the valving mechanism at the transfer station 14 is shifted to deliver the grouting mixture to the pressure screening station 16, for example as shown in the full line position of FIGURE 3.

This causes the grouting mixture to pass under pressure through discharge line 60 and transfer line 94 to the screening device 120 at station 16. The latter serves to screen out any oversize rocks or materials remaining in the grouting mixtures, while permitting grout of desired particle size to enter the holding station as indicated at 130. Periodically, upon indication of excessive screening pressures at the indicator 140, the screen device 120 is cleaned (as in FIGURE 9) to insure a proper screening action at the station 16.

Within the holding station 18, the final grouting mixture is continually agitated in an upward and inwardly directed rotary motion to insure a desired consistency for pumping to the construction site. During the holding operation, the air motors 176 and 178 for the high pressure pumps at the pumping station are stationary, permitting the high pressure pumps 174, 188 to function as valving members holding the grouting mixture in the tank 140. When the grout mixture is desired at the work site, the pumping stations are operated singly or in tandem, in the manner described above, to deliver the grouting mixture under high pressure to the desired point of use. Any suitable supply line of desired length and pressure capacity as presently employed in grouting plant operations can be employed for this purpose.

By way of example, a relatively small machine having an overall length of 87 inches, a width of 48 inches, and a height of 51 inches, is capable of being moved easily to a construction site by a pickup truck. Such unit is entirely self-contained, and once at the construction site needs only the connection of an air line and water line to facilitate its operation. In use this mobile grout plant is capable of handling an 8 to 1 sand-cement mixture at grouting pressures ranging from 100 up to 400 p.s.i., and at rates up to 3 cubic feet per minute. A somewhat larger machine having a length of 15 feet, a width of 5 feet and a height of 6 feet is capable of handling in excess of 5 cubic feet per minute in a similar operation. This plant weighs approximately 4100 pounds and is easily handled on a small platform or pickup truck. I have also employed a relatively large machine of 18 feet in length, 6 feet in width, and 8 feet in height, at pumping capacities ranging from 7 to 10 cubic feet per minute, at pumping pressures in excess of 400 p.s.i. Each of these units employs 5-cylinder radial air motors (model MEA, manufactured by Gardner-Denver, Quincy, Illinois) ranging from 3.8 to 7.5 H.P., and developing approximately 1200 r.p.m. at 60 to 100 pounds air pressure. These air motors are employed to drive high pressure screw type conveyor pumps (Moyno model 3–L, Robbins & Meyer, Inc., Springfield, Ohio) having port sizes ranging from 2 to 4 inches and capable of delivering up to 15 gallons per minute. Each size of plant has operated successfully at various construction sites to mix and maintain uniform consistencies of cement, sand, clay, bentonite, etc. in a wide range of proportions, with the desired delivery of the mix to areas one-half mile or more from the mobile position of the plant.

It will be evident from the foregoing that my new grouting plant provides a satisfactory mobile unit for a wide variety of uses. The mobile plant can be easily transported to the construction site by truck, or as a wheeled trailer. Where the units are mounted on skids (as illustrated in the drawings herein), wheels can be attached to the skids to facilitate movement rapidly from one area of use to another. My grouting plants offer the further advantage of being completely self-contained, requiring only the connection of air and water lines for operation. My mobile units are also designed for virtually continuous operation, with the mixing station operating to mix a new batch of material as a first mix is delivered from the holding station through the pumping station.

To those skilled in the art to which this invention relates, many changes in construction and widely differing embodiments and applications of the invention will suggest themselves without departing from the spirit and scope of the invention. For example, although power can be supplied by a combined air and hydraulic system, as described, power might also be supplied by gas or diesel hydraulic, or by electric hydraulic systems, employing electric motors or diesel or gasoline engines as the prime movers. In addition, although described principally as a mobile grouting plant, my new units are capable of successful use in a wide variety of similar operations involving the mixing and delivery of granular or powdered materials in slurry form. For example, my grouting plants might be used in various cement mixing operations, or in the mixing and delivery of cement, plaster, gunite, or similar materials for coating various surfaces. Also, the grout mixing operations described can be modified in many respects, for example by the addition of various chemical agents to form a chemical grout. Thus in the apparatus described, the valve control unit 210 might be employed to operate an air motor and pump unit to introduce liquid chemicals to the mixing station 12. These and other variations are considered to be clearly within the skill of one versed in this art, and the disclosures herein are consequently intended as illustrative and not in any sense limiting.

I claim:

1. In a self-contained mobile grout plant comprising: a load carrying frame, a grout mixing station on said frame including an upright substantially cylindrical mixing chamber with a conical outlet at its bottom, a recycle line leading from said outlet to an inlet near the top portion of said cylindrical chamber and directed slightly inwardly of a tangential line to impart a swirling centrifugal mixing of fluid materials circulated into said cylindrical mixing chamber, pump means positoned in said recycle line to recirculate the ingredients from the output of the mixing tank through the recycle line and to the top portion of the cylindrical mixing chamber, rough screening means mounted in the mixing chamber to interrupt the flow path of the slurry therein so that on formation of a slurry the slurry is circulated rapidly around over the upper surface of the screen in a rolling motion due to the combined effects of centrifugal force and frictional drag to thereby break up the materials to be mixed as they roll around on the screen; a slurry holding station on said frame; slurry transfer and screening stations on said frame connecting said mixing and holding stations, and a high pressure pumping station on said frame including a supply line adapted to discharge grout under high pressure and in slurry form to a work site.

2. A grout plant as in claim 1 in which the rough screening means is mounted at the junction between the conical outlet and the cylindrical portion of the mixing chamber.

3. A grout plant as in claim 2 in which said rough screening means is mounted transversely of the cylindrical mixing chamber.

4. In a mobile grouting plant, a frame forming a mobile load supporting platform, a mixing station at one end of said platform, said mixing station including rough screening means and means to continuously circulate water and the dry ingredients of a grouting mix through said screening means to form a pumpable slurry, a holding station at an opposite end of said platform, said holding station including means to continuously agitate said slurry in an upward and inward rotary motion, grout transfer and screening stations between said mixing and holding stations, said transfer station including means to withdraw the grouting mix in slurry form from said mixing station for transfer to said holding station, said screening station including relatively fine screening means to control the particle size of grouting mix fed as a slurry to said holding station, and a grout pumping station associated with said holding station, said pumping station including at least one high pressure pump and a grout supply line of extended length, whereby a pumpable grouting mix can be continuously mixed to desired consistency and particle size and pumped under high pressure to a work site.

5. A mobile grouting plant as in claim 4 wherein said screening station includes additional screening means arranged to receive internally a grouting mix in slurry form from said transfer station and to discharge a slurry of predetermined particle size externally of said additional screening means to said holding station.

6. A mobile grouting plant as in claim 5 wherein said additional screening means is movably positioned above said holding station to facilitate cleaning.

References Cited by the Examiner

UNITED STATES PATENTS

| | | | |
|---|---|---|---|
| 2,618,576 | 11/1952 | Brown | 259—161 |
| 2,664,277 | 12/1953 | Davies | 259—161 |
| 2,997,373 | 8/1961 | Stephens | 259—95 |
| 3,114,536 | 12/1963 | Demaison | 259—151 |

WALTER A. SCHEEL, *Primary Examiner.*

CHARLES A. WILLMUTH, *Examiner.*